Feb. 12, 1924.  
G. E. MANNING  
GLARE SHIELD  
Filed May 17, 1923
1,483,640
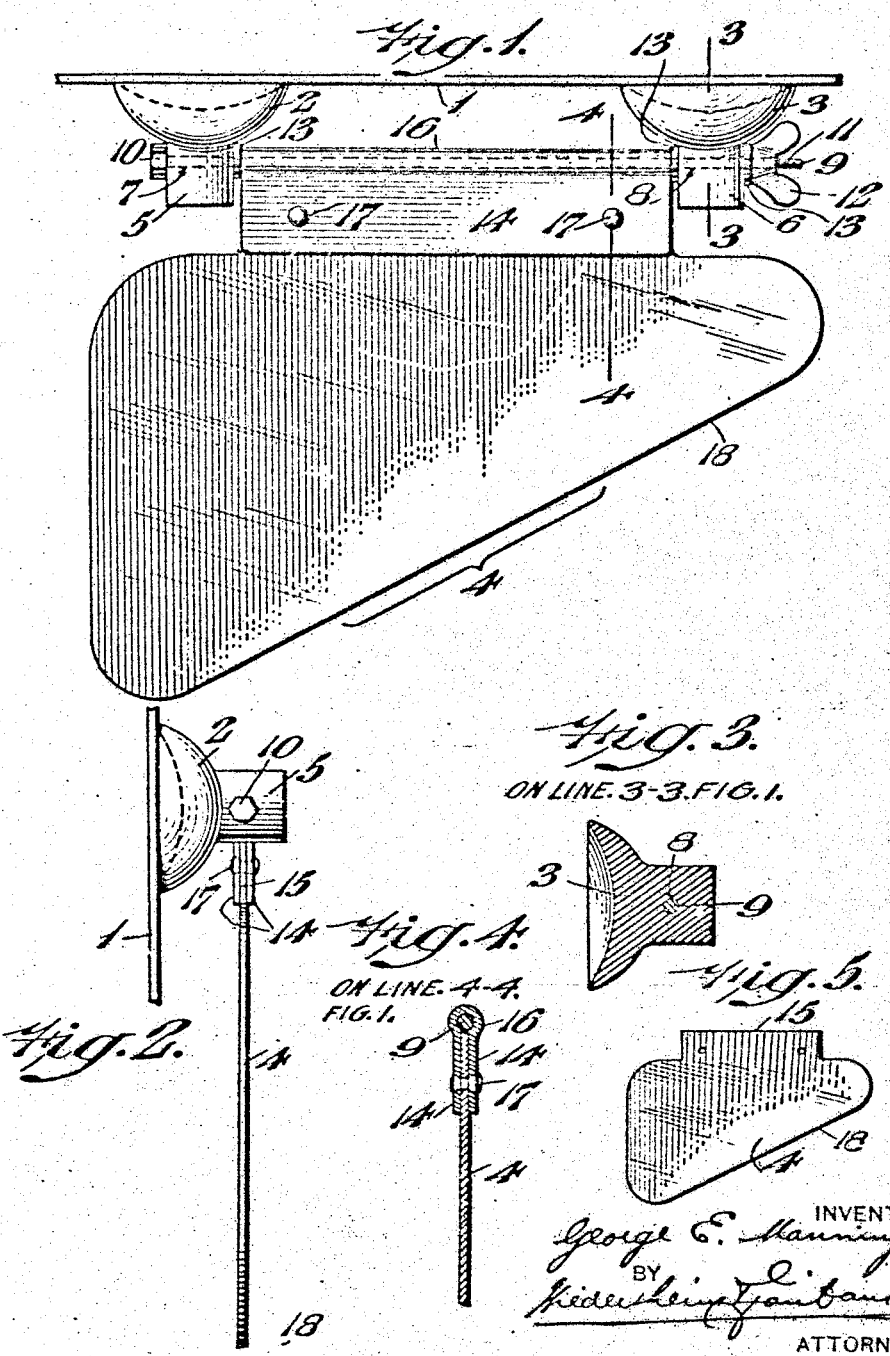

Patented Feb. 12, 1924.

1,483,640

UNITED STATES PATENT OFFICE.

GEORGE E. MANNING, OF PHILADELPHIA, PENNSYLVANIA.

GLARE SHIELD.

Application filed May 17, 1923. Serial No. 639,507.

*To all whom it may concern:*

Be it known that I, GEORGE E. MANNING, a citizen of the United States, residing in the city and county of Philadelphia and State of Pennsylvania, have invented a new and useful Glare Shield, of which the following is a specification.

My invention relates to a novel glare shield employed more particularly upon the wind shields of automobiles but applicable to other moving vehicles, the function of which is to shield the eyes of the driver of the vehicle to which my shield is applied from the direct glare of the head lights of approaching vehicles and the reflected glare of some classes of road surfaces.

With the foregoing general object in view, my invention consists of a novel glare shield, which may be readily applied to the wind shield of an automobile or other self-propelled vehicle by suction cups by which my novel shield is supported, which cups are applied directly to the wind shield of the vehicle under consideration.

My invention further consists of a novel construction of the shield by which the driver of the vehicle may through its use be enabled without injury to his eyes readily to watch the progress of an approaching vehicle.

My invention further consists of novel means for attaching and supporting the glare shield with respect to the wind shield of an automobile, whereby any rattling or vibration of the shield or its adjuncts is prevented.

My invention is capable of quick installation and being of simple construction can be manufactured in large quantities at small expense.

Broadly expressed, my invention contemplates a simple and effective device of a character adapted to protect the eyes of a driver of a moving vehicle from the glare of the head lights of an approaching vehicle.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

In the drawings, Figure 1 represents a plan view of a glare shield, embodying my invention, in the position which the parts assume when the wind shield is open and the glare shield in service, showing also a portion of a wind shield.

Figure 2 represents a side elevation of the glare shield and its adjuncts seen in Figure 1, in its operative position, when the wind shield is closed and in vertical position.

Figure 3 represents a section through one of the suction cups on the line 3—3 of Figure 1.

Figure 4 represents a section on the line 4—4 of Figure 1, and Figure 5 represents on a reduced scale a plan view of the glare shield in detached position.

Similar numerals of reference indicate corresponding parts.

Referring to the drawings:—

In the drawings, 1 designates a fragmentary portion of a typical wind shield of an automobile or similar vehicle. 2 and 3 respectively designate a pair of counterpart suction cups of rubber or kindred material, through the medium of which in their suctional application to the wind shield my glare shield 4 is mounted.

Each of the suction cups 2 and 3 is formed with a rearwardly extending boss, 5 and 6 respectively, each of which is perforated in horizontal alignment by bolt holes 7 and 8 respectively through which holes passes a carrying bolt 9 extending transversely between and through the bosses of the suction cups and in parallelism with and to the rear of the wind shield 1.

This carrying bolt 9 is at one end headed as at 10, and the other end threaded as at 11 to receive a wind nut 12 by means of which the glare shield 4 is supported in the various positions it may assume.

13 designates washers between the inside of each boss and the outer ends of a U-shaped clip 14, which clip is clamped upon the upper horizontal portion 15 of the glare shield 4, and is formed with a bent head 16 to encompass the carrying bolt 9, as best illustrated in Figure 4.

The opposite and similar sides of the clip 14 are secured to the upper tongue or edge 15 or the upper part of the glare shield by rivets or other suitable fastening devices 17. The clip and bolt and nut are all preferably formed of metal, while the suction cups are, as stated, formed of rubber or an equivalent material, and the glare shield 4 is formed of glass, celluloid, paper or other equivalent tinted translucent material, preferably of green, amber or other light-deadening color. The lower edge of the glare shield is inclined as at 18, so as to give a triangular contour thereto, the greatest depth of the shield being at the left.

In the operation of my device, assuming it to be in use as at night, the parts appear as seen in Figure 2, the shield standing in a vertical plane or having its lower end contacting with the wind shield 1, and the wing nut 12 being tightened to the desired extent and affording an efficient means for shielding the eyes of the driver.

In the day time, when the shield is not in use, it is only necessary to turn it into the upper reverse position from that seen in Figure 2, so that it will be out of the normal line of vision of the driver.

I prefer the glare shield to be triangular in general outline, as, illustrated in Figures 1 and 5,—the purpose being to enable the driver to exercise his vision at will through a smaller or a larger light-subduing area, but it is evident that other slight changes may be made in the contour thereof without departing from the spirit of my invention.

It will be apparent that my invention not only functions effectively, as an auto glare shield, but in addition gives the driver great protection when driving against the sun.

The triangular shape is employed because it will intercept the glare of the headlights of an approaching car from the time it is first seen far down the road, until it passes and still give the driver a clear view of the road without seeing through the glare shield. A square shield or a round shield will not do this.

The arrangement for fastening the shield to the rubber cups is employed to enable the user to reverse the position of the shield from night use to day use and particularly to simplify the adjustment so as to have protection against the sun or blinding headlights irrespective of whether the wind shield is open or closed. With the wind shield open, the glare shield can be adjusted so that the same hangs down, substantially vertically and by tightening the wing nut 12, the wind cannot blow the shield back or from the desired position. This adjustment is made without removing the vacuum cups from the wind shield. This adjustment also applies to the opening of the wind shield one quarter or one-half as well as wide open and it will be apparent that my novel glare shield is adjustable with respect to the wind shield, no matter at what angle the wind shield may stand.

This feature of the adjusting nut on the bolt, so as to lock the glare shield 4, in its various adjusted positions, with respect to the open or closed position of the wind shield is one of great importance in the practical use of my device, as is evident.

It will now be apparent that I have devised a novel and useful glare shield which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:

1. In a device of the character described, a plurality of suction cups having rearwardly projecting perforated bosses, a bolt passing through the perforated bosses, a supporting clip positioned between said cups and swingable on the bolt, washers intermediate the ends of said clips and on the bolt, a shield having its upper edge rigidly secured to said clip, and means on the bolt for locking the clip in a plurality of different positions.

2. In a device of the character described, a plurality of suction cups having rearwardly projecting perforated bosses, a headed bolt passing through the perforations in the bosses, a thumb nut having threaded engagement with one end of the bolt, the nut and head of the bolt being adapted to engage the bosses, a clip embracing the bolt and located between the bosses having its opposite edges clamped against the perforated bosses when the threaded nut is adjusted, and a transparent shield having its upper edge secured to said clip and adapted to be supported with the clip in a plurality of different positions by the adjustment of the nut on the bolt.

GEO. E. MANNING

Witnesses:
CHAS. K. HICKS,
E. HAYWARD FAIRBANKS.